United States Patent
Ji (10) Patent No.: US 11,556,351 B1
(45) Date of Patent: Jan. 17, 2023

(54) FACILITATION OF APPLICATION CONTAINERIZATION

(71) Applicant: International Business Machines Corporation, Armonk, NY (US)

(72) Inventor: Zhigang Ji, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/500,033

(22) Filed: Oct. 13, 2021

(51) Int. Cl.
*G06F 9/44* (2018.01)
*G06F 9/445* (2018.01)
*G06F 16/17* (2019.01)

(52) U.S. Cl.
CPC .............. *G06F 9/445* (2013.01); *G06F 16/17* (2019.01)

(58) Field of Classification Search
CPC ....................................................... G06F 9/445
USPC ........................................................ 719/320
See application file for complete search history.

(56) References Cited

U.S. PATENT DOCUMENTS

| | | | | |
|---|---|---|---|---|
| 8,056,092 | B2 * | 11/2011 | Allen | G06F 9/541 |
| | | | | 719/320 |
| 9,104,794 | B2 | 8/2015 | Zakonov | |
| 2016/0191645 | A1 * | 6/2016 | Hayton | H04L 67/568 |
| | | | | 709/203 |
| 2016/0380916 | A1 | 12/2016 | Gnaneswaran | |
| 2017/0315795 | A1 | 11/2017 | Keller | |
| 2018/0337955 | A1 * | 11/2018 | Aamir | G06F 21/53 |
| 2020/0379794 | A1 | 12/2020 | Kim | |

FOREIGN PATENT DOCUMENTS

CN 108920250 A 11/2018

OTHER PUBLICATIONS

Krzywiec, Wojciech. "How to put your Java application into Docker container." Published Apr. 16, 2019. 12 pages. Published by Medium. https://wkrzywiec.medium.com/how-to-put-your-java-application-into-docker-container-5e0a02acdd6b.

Mell, et al., "The NIST Definition of Cloud Computing," Recommendations of the National Institute of Standards and Technology, U.S. Department of Commerce, Special Publication 800-145, Sep. 2011, 7 pgs.

MS-JGOL, et al., "Java codeless application monitoring Azure Monitor Application Insights." Published Mar. 29, 2020. 10 pages. Published by Microsoft. https://docs.microsoft.com/en-us/azure/azure-monitor/app/java-in-process-agent.

* cited by examiner

*Primary Examiner* — Timothy A Mudrick
(74) *Attorney, Agent, or Firm* — Haley McClory (57) ABSTRACT

A processor may run a target application. A processor may monitor one or more file open operations performed by the target application. A processor may record one or more file information items associated with one or more files, wherein the one or more files are opened by the one or more file open operations. A processor may select one or more target file information items, wherein the one or more target file items include a target file property from the one or more file information items. A processor may retrieve a first set of file names of one or more target files used by the target application from the one or more target file information items. A processor may utilize the one or more target files to facilitate containerization of the target application.

20 Claims, 6 Drawing Sheets

| File Name | File Extension | File Location/Path | File Type | |
|---|---|---|---|---|
| Arial | ttf | C:\Windows\Fonts | Font | ～ 510 |
| Times New Roman | ttf | C:\Windows\Fonts | Font | ～ 510 |
| Calibri | ttf | C:\Windows\Fonts | Font | ～ 510 |
| photo of my son | jpg | D:\...\image | Image | ～ 510 |
| Arial Black (511) | ttf (511) | C:\Windows\Fonts (511) | Font (511) | ～ 510 |

FACILITATION OF APPLICATION CONTAINERIZATION

BACKGROUND

The present invention relates to computer technology, and more specifically, to a computer-implemented method, computer system, and computer program product for facilitating application containerization.

A containerized application, also referred to as a container, is an instantiation of its corresponding container base image, which is a template for building the containerized application. Container base images become containers at runtime. Containers share a machine's Operation System (OS) kernel and therefore do not require an OS per application. Applications existed on the OS may be containerized upon demand.

SUMMARY

Embodiments of the present disclosure include a method, computer program product, and system for facilitating application containerization. A processor may run a target application. A processor may monitor one or more file open operations performed by the target application. A processor may record one or more file information items associated with one or more files, wherein the one or more files are opened by the one or more file open operations. A processor may select one or more target file information items, wherein the one or more target file items include a target file property from the one or more file information items. A processor may retrieve a first set of file names of one or more target files used by the target application from the one or more target file information items. A processor may utilize the one or more target files to facilitate containerization of the target application.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

Some embodiments may be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention may be capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
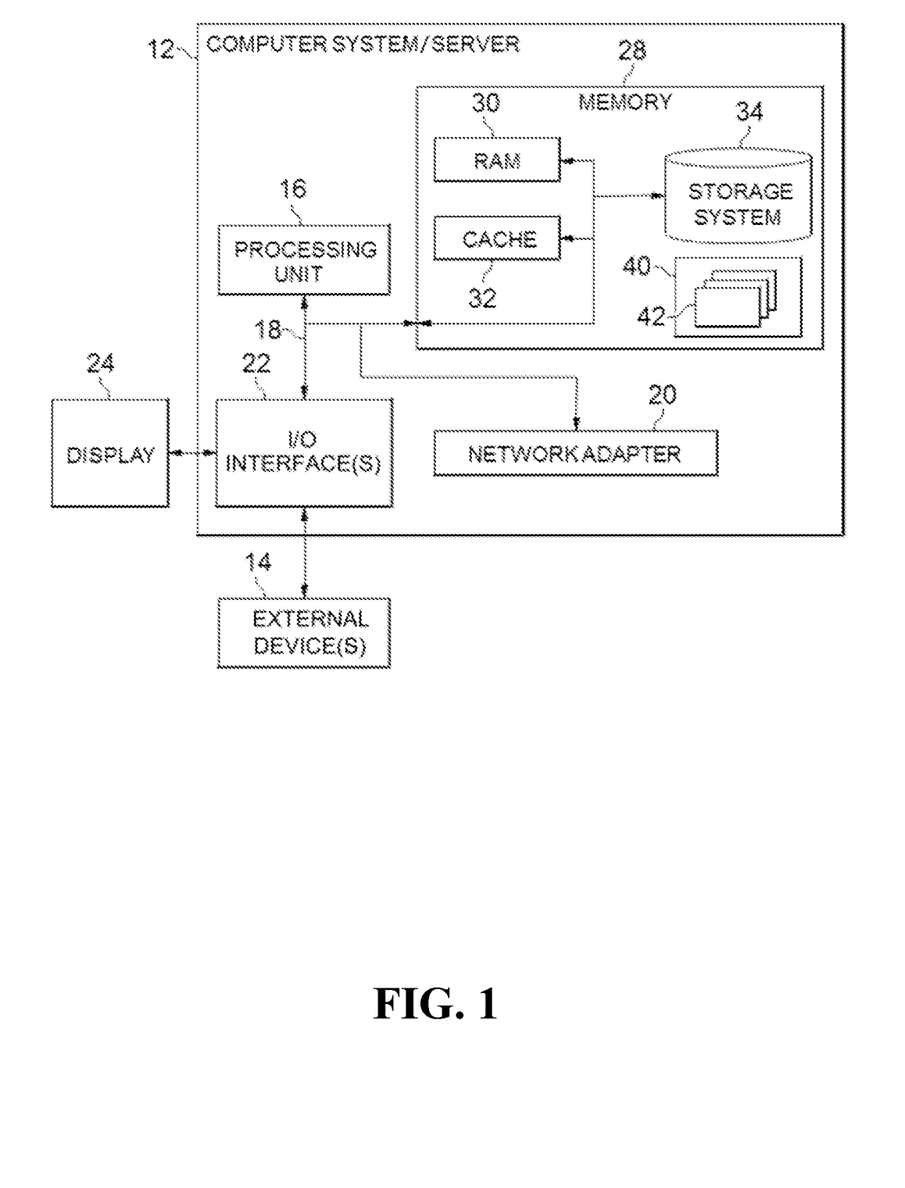
FIG. 1 depicts a cloud computing node, in accordance with the present disclosure.

Referring now to FIG. 1, a schematic of an example of a cloud computing node is depicted. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of computing systems, environments, and/or configurations that may be suitable for use with computer system/server 12 may include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, etc. that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 may be depicted in the form of a general-purpose computing device. The components of computer system/server 12 may include, but is not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
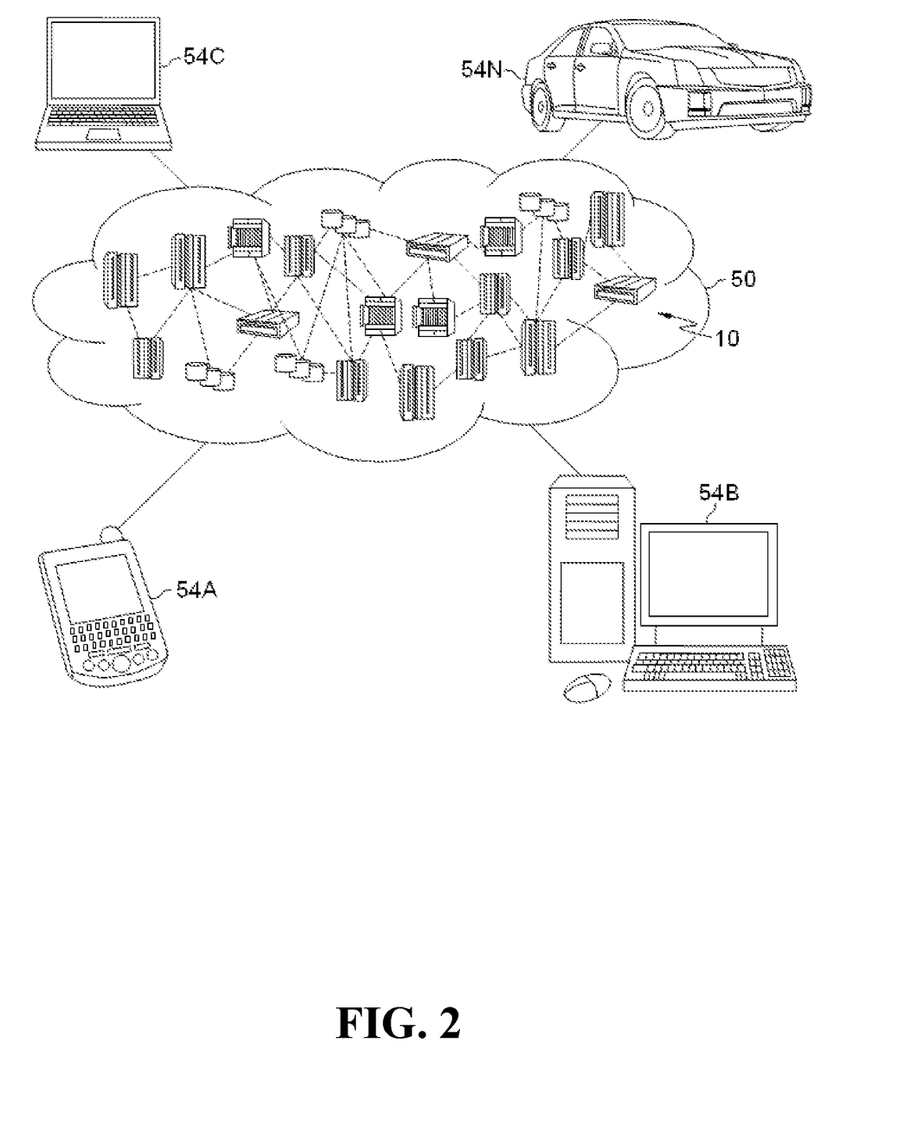
FIG. 2 depicts a cloud computing environment, in accordance with the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
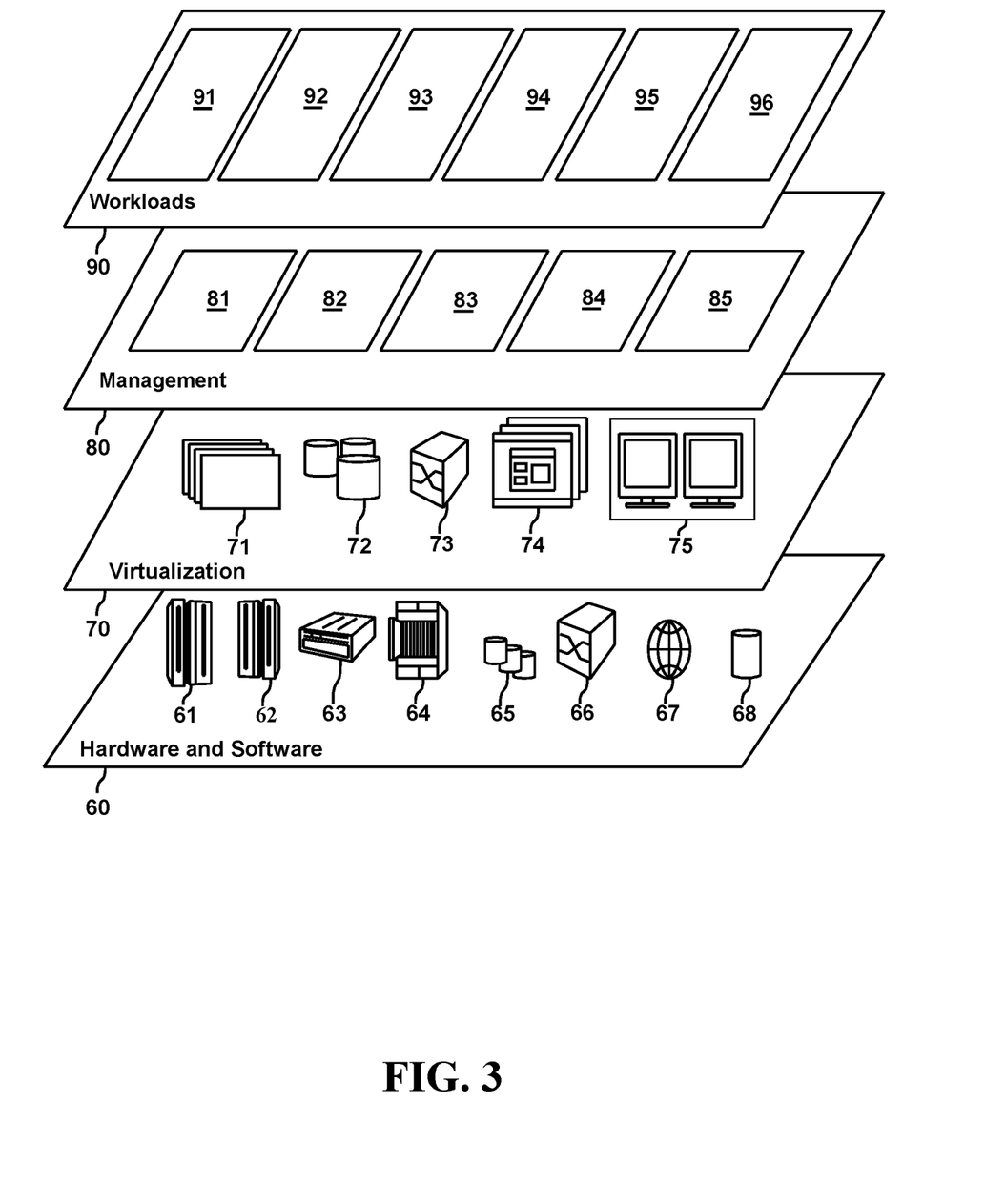
FIG. 3 depicts abstraction model layers, in accordance with the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and facilitation of application containerization 96.

When containerizing a target application on a traditional OS, all the files the target application may depend on may be required to be migrated together with the target application. The files the target application depends on may be referred to as dependent files of the target application, or dependent files for short. It is noted that the dependent files of the target application may also be the dependent files of the containerized application.

In some embodiments, some dependent files, such as, font files, may not be included (e.g., forgotten) in the containerized application when containerizing the target application. This may occur when the dependent files are not directly presented in source code of the target application but may instead be indirectly called by libraries the target application depends on. If the developer or programmer of the containerized application does not have enough knowledge of the target application, he/she may not include some or all of the dependent files associated with the target application in the containerized application.

Such embodiments may result in failure of the containerized application when it is running. For example, if a font file used by the target application is not included in the containerized target application, the font of the containerized target application may not be displayed as expected. In some scenarios, if an expected font is not available in the containerized target application, some unexpected symbols may be incorrectly displayed in the containerized target application. In an example, if an expected font is not available in a containerized PDF application, a default font may be adopted automatically, but some unexpected space may be incorrectly displayed in the containerized PDF application.

From the above, one can be aware of the importance of knowing all the dependent files of the target application before containerizing it, so as to facilitate the containerization of the target application by including all the dependent files in the containerized application.

One manner of finding all the dependent files of the target application may include checking the source code of the target application. However, such methods may be not only tedious, but also insufficient to find all the dependent files because some dependent files may be opened dynamically without explicit declaration in the source code. This may occur if the dependent files are called in the libraries that the target application depends on. Since an objective of the present application is to find all the dependent files of the target application, the dependent file(s) may be referred to as a target file in embodiments contemplated herein.

Figure 4:
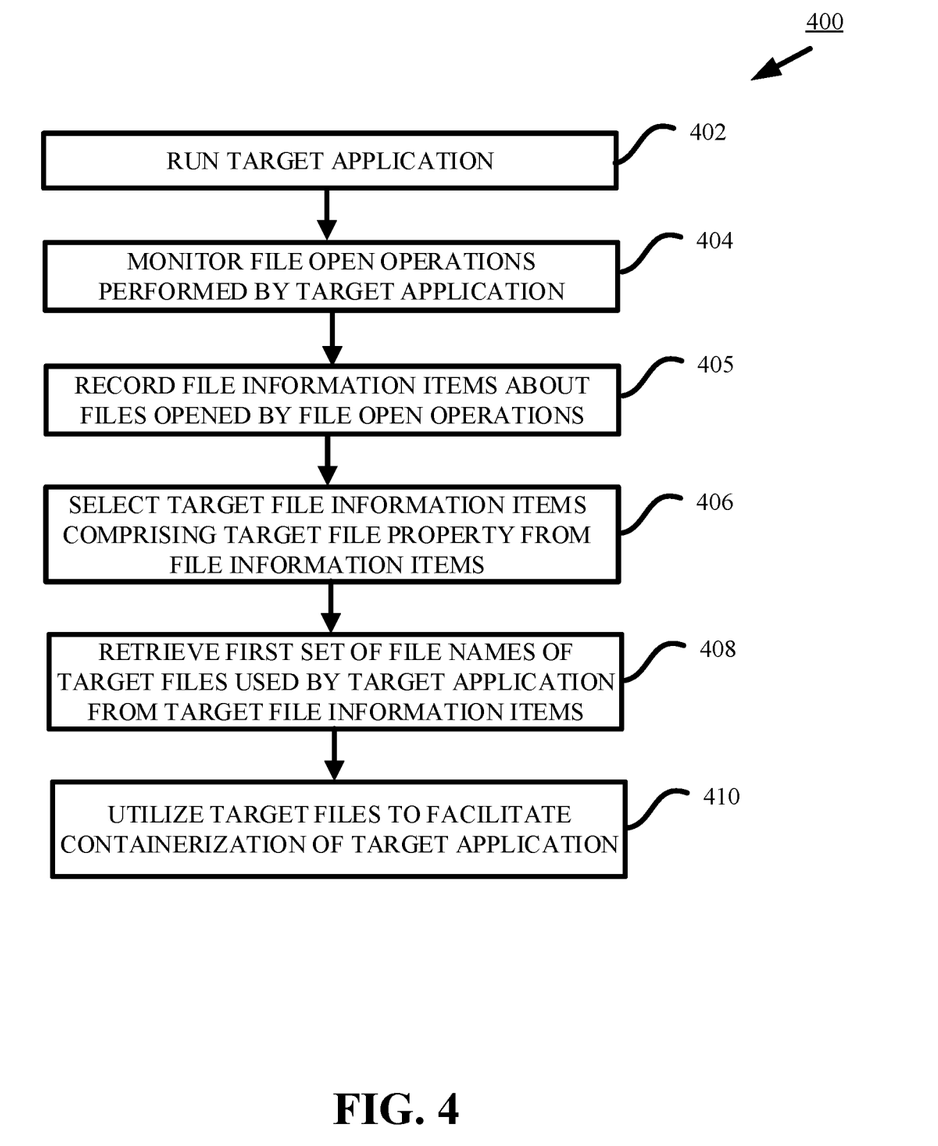
FIG. 4 depicts a schematic flowchart of the method for facilitating application containerization, in accordance with the present disclosure.

A simpler method for finding all the dependent files of the target application in order to facilitate application containerization is disclosed herein. With reference now to FIG. 4, it shows a schematic flowchart of the method 400 for facilitating application containerization according to some embodiments of the present disclosure.

In the method 400 as shown in FIG. 4, at block 402, a target application is run. The target application may be run on a traditional OS, such as Linux, Unix, Windows, and the like. As soon as the target application is run, a Process Identifier, PID, of the target application process may be generated. The PID can be used to identify the target application.

At block 404, one or more file open operations performed by the target application may be monitored. In an example, a monitor agent may be attached to the target application to monitor the one or more file open operations performed by the target application. The monitor agent may be attached to the target application based on the PID of the target application process. Specifically, the monitor agent may be attached to the application having the PID generated at block 402. In an embodiment, the monitor agent may monitor all the file open operations performed by the target application, and recode the respective file information items about all the files opened by the target application.

If the target application depends on a file, the target application may open the file using a file open operation when the target application is running. If the file open operation is monitored, the monitor agent may obtain a file information item about the file opened.

At block 405, one or more file information items about one or more files may be opened by the one or more file open operations and may be record. The one or more file information items may be recorded or written in a log file by the monitor agent. The file information item may describe useful information for identifying the file.

Figure 5:
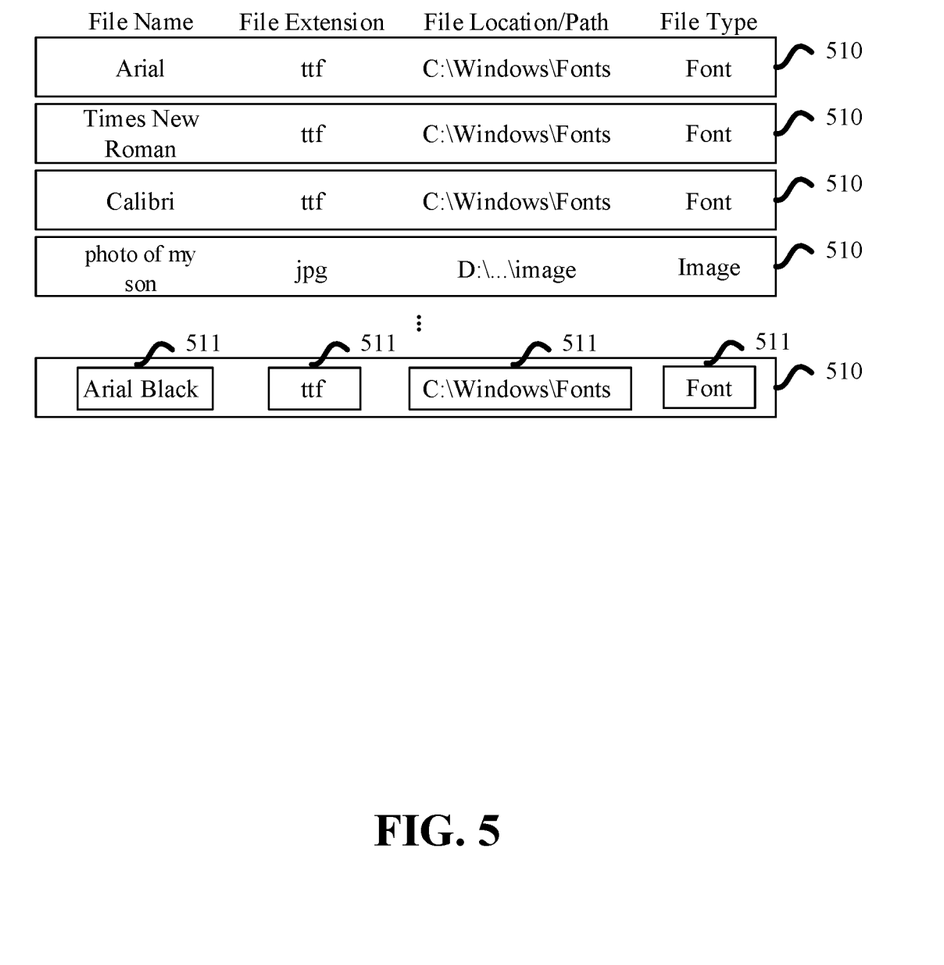
FIG. 5 depicts a schematic diagram of several example file information items, in accordance with the present disclosure.

A schematic flowchart of several example file information items is illustrated in FIG. 5. As shown in FIG. 5, each file information item 510 may include several file properties 511, such as a file name, a file extension, a file location/path, or a file type. In some cases, the file type may be not included in the file information item 510. If so, the file type may be inferred from the file name, the file extension, or the file location/path.

In the example of FIG. 5, a first file information item 510 may include the file name "Arial," the file extension "ttf," the file location/path "C:\Windows\Fonts," and the file type "Font." In embodiments where the file type is absent in the first file information item 510, it may be inferred that the file type is font from one or more of the file name "Arial," the file extension "ttf," and the file location/path "C:\Windows\Fonts." Because "Arial" is a common font type, "ttf" is a typical file extension for font file, and "C:\Windows\Fonts" is a default folder to store the font files. In this case, the file type "Font" may be added to the first file information item 510, as shown in FIG. 5.

Similarly, a second file information item 510 may include the file name "Times New Roman," the file extension "ttf," the file location/path "C:\Windows\Fonts," and the file type "Font." In embodiments where the file type is absent in the second file information item 510, it may be inferred that the file type is font from one or more of the file name "Times New Roman," the file extension "ttf," and the file location/path "C:\Windows\Fonts." Because "Times New Roman" is the common font type, "ttf" is the typical file extension for font file, and "C:\Windows\Fonts" is the default folder to store the font files. In this embodiment, the file type "Font" may be added to the second file information item 510, as shown in FIG. 5.

Likewise, a third file information item 510 may include the file name "Calibri," the file extension "ttf," the file location/path "C:\Windows\Fonts," and the file type "Font." In the embodiments where the file type is absent in the third file information item 510, it may be inferred that the file type is font from one or more of the file name "Calibri," the file extension "ttf," and the file location/path "C:\Windows\Fonts." Because "Calibri" is the common font type, "ttf" is the typical file extension for font file, and "C:\Windows\Fonts" is the default folder to store the font files. In this case, the file type "Font" may be added to the third file information item 510, as shown in FIG. 5.

A fourth file information item 510, different from the above file information items 510, may include the file name "photo of my son," the file extension "jpg," the file location/path "D:\ . . . \image," and the file type "Image." In embodiments where the file type is absent in the fourth file information item 510, it may be inferred that the file type is image from one or more of the file name "photo of my son," the file extension "jpg," and the file location/path "D:\ . . . \image." In this case, the file type "Image" may be added to the fourth file information item 510.

The last file information item 510, similar to the first to third file information items 510, may include the file name "Arial Black," the file extension "ttf," the file location/path "C:\Windows\Fonts," and the file type "Font." In the case where the file type is absent in the last file information item 510, it may be inferred that the file type is font from one or more of the file name "Arial Black," the file extension "ttf," and the file location/path "C:\Windows\Fonts." Because "Arial Black" is the common font type, "ttf" is the typical file extension for font file, and "C:\Windows\Fonts" is the default folder to store the font files. In this embodiment, the file type "Font" may be added to the last file information item 510, as shown in FIG. 5.

At block 406, one or more target file information items comprising a target file property are selected from the one or more file information items. As described above, the file information item is about the file opened. In this sense, the target file information item may be about the target file opened. The target file information items and thus the target file may be identified by the target file property. In an embodiment, the one or more target file information items comprising the target file property may include all the target file information items comprising the target file property. The target file property may comprise at least one of: a target file name, a target file type, a target file extension, a target file location, or a target file path. In an example, the target file type may comprise the font file.

Taking the target file property being the target file type and the target file type being the font file as an example, the process of selecting the target file information items is described below in conjunction with the example of FIG. 5. In the process, the file type included in each file information item 510 may be checked, and the file information items 510 including font file type may be selected as the target file information items 510. As shown in FIG. 5, the first, second, third and last file information items 510 may be selected as the target file information items 510, as indicated by the dotted boxes.

At block 408, a first set of file names of one or more target files used by the target application is retrieved from the one or more target file information items. In an embodiment, the one or more target files used by the target application may include all the target files used by the target application. In the above example where the first, second, third and last file information items 510 are selected as the target file information items 510, it can be inferred that the target files used by the target application may be "C:\Windows\Fonts\Arial.ttf," "C:\Windows\Fonts\Times New Roman.ttf," "C:\Windows\Fonts\Calibri.ttf," and "C:\Windows\Fonts\Arial Black.ttf." The first set of file names of the target files may include "Arial," "Times New Roman," "Calibri" and "Arial Black."

At block 410, the one or more target files are utilized to facilitate containerization of the target application. In the above example, the target files "C:\Windows\Fonts\Arial.ttf," "C:\Windows\Fonts\Times New Roman.ttf," "C:\Windows\Fonts\Calibri.ttf," and "C:\Windows\Fonts\Arial Black.ttf' may be utilized to facilitate containerization of the target application. These target files may be the font files the target application depends on or needs.

Figure 6:
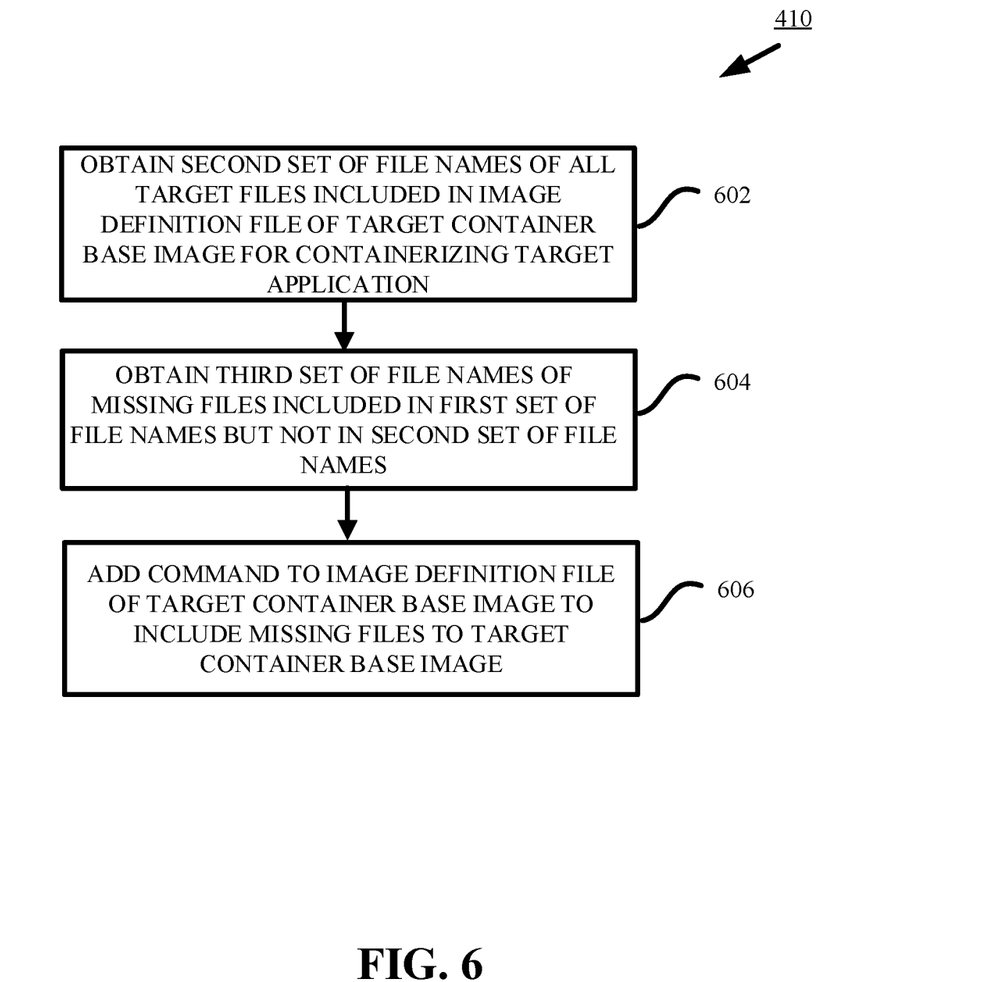
FIG. 6 depicts a schematic flowchart for illustrating an example process of utilizing the one or more target files to facilitate containerization of the target application, in accordance with the present disclosure.

An example process of utilizing the one or more target files to facilitate containerization of the target application is contemplated below, with embodiments referring to FIG. 6. In an embodiment, an initial or draft image definition file of a container base image for containerizing the target application may be prepared in advance. In the context, the container base image for containerizing the target application may be referred to as a target container base image.

At block 602, a second set of file names of all the target files included in an image definition file of a target container base image for containerizing the target application may be obtained. In the example of the target file being the font file, all the font files included in the image definition file of the target container base image may be searched, and the second set of file names of all the font files may be obtained. For example, all the font files included in the image definition file of the target container base image may be "Arial" and "Times New Roman." Therefore, the second set of file names may include "Arial" and "Times New Roman."

At block 604, a third set of file names of one or more missing files which are included in the first set of file names but not in the second set of file names may be obtained. By comparing the first set of file names and the second set of file names, it can be found which files are missed in the image definition file of the target container base image. In the above example where the first set of file names includes "Arial," "Times New Roman," "Calibri" and "Arial Black," and the second set of file names include "Arial" and "Times New Roman," it may be easier to find that font files "Calibri" and "Arial Black" are missed in the image definition file. As such, the third set of file names of the missing files are "Calibri" and "Arial Black."

At block 606, a command is added to the image definition file of the target container base image to include the one or more missing files to the target container base image. In the above example where font files "Calibri" and "Arial Black" are the missing files, they may be included or copied to the target container base image by adding a copy command to the image definition file of the target container base image. The copy command may define a copy operation to copy the missing files from the target file locations to the target container base image.

Before or after the operation performed at block 606, the third set of file names of the one or more missing files may be displayed, as to assist the developer or programmer to check a result of the operation performed at block 606.

The embodiments of the present disclosure ensure all dependent files of the target application are found, without analyzing the source code of the target application or knowing an implementation detail of the target application. The embodiments of the present disclosure are further able to include the missing dependent file to the containerized application, so as to facilitate the containerization of the target application.

It should be noted that the processing of facilitation of application containerization according to embodiments of this disclosure could be implemented by computer system/server 12 of FIG. 1.

Under the same inventive concept, another embodiment of the present invention can provide a computer system for facilitating application containerization. The computer system may comprise one or more processors, a memory coupled to at least one of the processors, and a set of computer program instructions stored in the memory. The set of computer program instructions are executed by at least one of the processors to run a target application; monitor one or more file open operations performed by the target application; record one or more file information items about one or more files opened by the one or more file open operations; select one or more target file information items comprising a target file property from the one or more file information items; retrieve a first set of file names of one or more target files used by the target application from the one or more target file information items; and utilize the one or more target files to facilitate containerization of the target application.

Similarly, under the same inventive concept, another embodiment of the present invention can provide a computer program product for facilitating application containerization. The computer program product comprises a computer readable storage medium having program instructions embodied therewith. The program instructions are executable by a processor to run a target application; monitor one or more file open operations performed by the target application; record one or more file information items about one or more files opened by the one or more file open operations; select one or more target file information items comprising a target file property from the one or more file information items; retrieve a first set of file names of one or more target files used by the target application from the one or more target file information items; and utilize the one or more target files to facilitate containerization of the target application.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
running, by a processor, a target application;
monitoring one or more file open operations performed by the target application;
recording one or more file information items associated with one or more files, wherein the one or more files are opened by the one or more file open operations;
selecting one or more target file information items, wherein the one or more target file items include a target file property from the one or more file information items;
retrieving a first set of file names of one or more target files used by the target application from the one or more target file information items; and
utilizing the one or more target files to facilitate containerization of the target application.

2. The method of claim 1, wherein the target file property is selected from a group consisting of a target file name, a target file type, a target file extension, a target file location, and a target file path.

3. The method of claim 1, wherein a target file type includes a font file.

4. The method of claim 1, wherein the one or more file open operations includes, at least one of the file open operations performed by the target application, and the first set of file names of the one or more target files includes the file names of the target files used by the target application.

5. The method of claim 4, wherein utilizing the one or more target files to facilitate containerization of the target application further comprises:
obtaining a second set of file names of the target files included in an image definition file of a target container base image for containerizing the target application;
obtaining a third set of file names of one or more missing files which are included in the first set of file names but not in the second set of file names; and
adding a command to the image definition file of the target container base image, wherein the command includes the one or more missing files to the target container base image.

6. The method of claim 5, wherein utilizing the one or more target files to facilitate containerization of the target application further including:
displaying the third set of file names associated with the one or more missing files.

7. The method of claim 1, wherein the monitoring and recording is performed by a monitor agent attached to the target application.

8. A system comprising:
one or more processors;
a memory coupled to the one or more processors; and
a set of computer program instructions stored in the memory and executed by the one or more processors to implement a method comprising:
running, by a processor, a target application;
monitoring one or more file open operations performed by the target application;
recording one or more file information items associated with one or more files, wherein the one or more files are opened by the one or more file open operations;
selecting one or more target file information items, wherein the one or more target file items include a target file property from the one or more file information items;
retrieving a first set of file names of one or more target files used by the target application from the one or more target file information items; and
utilizing the one or more target files to facilitate containerization of the target application.

9. The computer system of claim 8, wherein the target file property is selected from a group consisting of a target file name, a target file type, a target file extension, a target file location, and a target file path.

10. The computer system of claim 8, wherein a target file type comprises font file.

11. The computer system of claim 8, wherein the one or more file open operations includes, at least one of the file open operations performed by the target application, and the first set of file names of the one or more target files includes the file names of the target files used by the target application.

12. The computer system of claim 11, wherein utilizing the one or more target files to facilitate containerization of the target application further comprises:
obtaining a second set of file names of the target files included in an image definition file of a target container base image for containerizing the target application;
obtaining a third set of file names of one or more missing files which are included in the first set of file names but not in the second set of file names; and
adding a command to the image definition file of the target container base image, wherein the command includes the one or more missing files to the target container base image.

13. The computer system of claim 12, wherein utilizing the one or more target files to facilitate containerization of the target application further including:
displaying the third set of file names associated with the one or more missing files.

14. The computer system of claim 8, wherein the monitoring and recording is performed by a monitor agent attached to the target application.

15. A computer program product, wherein the computer program product comprises a computer readable storage medium having program instructions embodied therewith, wherein the program instructions are executable by one or more processors to implement a method comprising:
running, by a processor, a target application;
monitoring one or more file open operations performed by the target application;
recording one or more file information items associated with one or more files, wherein the one or more files are opened by the one or more file open operations;
selecting one or more target file information items, wherein the one or more target file items include a target file property from the one or more file information items;
retrieving a first set of file names of one or more target files used by the target application from the one or more target file information items; and
utilizing the one or more target files to facilitate containerization of the target application.

16. The computer program product of claim 15, The computer system of claim 8, wherein the target file property is selected from a group consisting of a target file name, a target file type, a target file extension, a target file location, and a target file path.

17. The computer program product of claim 15, wherein a target file type comprises font file.

18. The computer program product of claim 15, wherein the one or more file open operations includes, at least one of the file open operations performed by the target application, and the first set of file names of the one or more target files includes the file names of the target files used by the target application.

19. The computer program product of claim 18, wherein utilizing the one or more target files to facilitate containerization of the target application further comprises:
obtaining a second set of file names of the target files included in an image definition file of a target container base image for containerizing the target application;
obtaining a third set of file names of one or more missing files which are included in the first set of file names but not in the second set of file names; and
adding a command to the image definition file of the target container base image, wherein the command includes the one or more missing files to the target container base image.

20. The computer program product of claim 19, wherein utilizing the one or more target files to facilitate containerization of the target application further including:

displaying the third set of file names associated with the one or more missing files.

\* \* \* \* \*